United States Patent
Lee et al.

(10) Patent No.: US 10,356,749 B2
(45) Date of Patent: Jul. 16, 2019

(54) METHOD AND APPARATUS FOR TRANSMITTING BEAM-FORMED PAGING BASED ON FEEDBACK IN WIRELESS COMMUNICATION SYSTEM

(71) Applicant: LG ELECTRONICS INC., Seoul (KR)

(72) Inventors: Youngdae Lee, Seoul (KR); Sangwon Kim, Seoul (KR); Jaewook Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 41 days.

(21) Appl. No.: 15/655,786

(22) Filed: Jul. 20, 2017

(65) Prior Publication Data

US 2018/0027522 A1   Jan. 25, 2018

Related U.S. Application Data

(60) Provisional application No. 62/364,829, filed on Jul. 20, 2016.

(51) Int. Cl.
*H04W 68/02* (2009.01)
*H04W 72/04* (2009.01)
(Continued)

(52) U.S. Cl.
CPC ....... *H04W 68/02* (2013.01); *H04W 72/0413* (2013.01); *H04W 16/28* (2013.01);
(Continued)

(58) Field of Classification Search
CPC ..... H04W 24/00; H04W 84/12; H04W 88/08; H04W 80/04; H04W 88/06; H04W 84/18;
(Continued)

(56) References Cited

U.S. PATENT DOCUMENTS

2004/0214606 A1* 10/2004 Wichman ............. H04B 7/0408
455/562.1
2013/0258885 A1* 10/2013 Yu ......................... H04W 16/28
370/252

(Continued)

OTHER PUBLICATIONS

"3rd Generation Partnership Project: Technical Specification Group Radio Access Network; Evolved Universal Terrestrial Radio Access (E-UTRA); User Equipment (UE) Procedures in Idle Mode", Release 13, 3GPP TS 36.304, vol. 13.2.0, Jun. 2016, 5 pages.

(Continued)

*Primary Examiner* — Brenda H Pham
(74) *Attorney, Agent, or Firm* — Lee Hong Degerman Kang Waimey

(57) ABSTRACT

According to the present invention, a user equipment (UE) receives a beam-formed paging message based on a feedback, which is transmitted by the UE to a network. The UE receives, in a first period, a paging indicator via multiple beams from a network node, and selects a beam from the multiple beams. Then, the UE transmits, in a second period, a feedback indicating the selected beam to the network node via the selected beam, and monitors, in a third period, the selected beam to acquire a paging message from the network node.

10 Claims, 7 Drawing Sheets

(51) Int. Cl.
 *H04W 72/02* (2009.01)
 *H04W 16/28* (2009.01)
(52) U.S. Cl.
 CPC .......... *H04W 72/02* (2013.01); *H04W 72/046* (2013.01); *H04W 72/048* (2013.01); *H04W 72/0446* (2013.01)
(58) Field of Classification Search
 CPC ..... H04W 74/08; H04W 36/30; H04W 36/24; H04W 52/40; H04W 8/26; H04W 56/00; H04W 56/0045; H04W 68/02; H04W 72/0413; H04W 72/0446; H04W 72/046; H04W 72/02; H04W 72/048; H04W 16/28; H04L 43/50; H04L 43/0852; H04L 43/08; H04L 2012/5608; H04B 17/003; H04B 7/0617; H04B 7/04; H04B 7/2662; H04B 1/50; H04B 1/56; H04J 2011/0096
 USPC .... 370/252, 310.2, 328, 338, 332, 334, 349, 370/350, 339
 See application file for complete search history.

(56) References Cited

U.S. PATENT DOCUMENTS

| | | | |
|---|---|---|---|
| 2014/0056256 A1* | 2/2014 | Kim ................... | H04W 72/046 370/329 |
| 2014/0120926 A1* | 5/2014 | Shin ..................... | H04W 56/00 455/450 |
| 2016/0119895 A1* | 4/2016 | Agiwal ................ | H04B 7/0408 455/458 |
| 2016/0373180 A1* | 12/2016 | Guo ...................... | H04B 7/063 |
| 2017/0207843 A1* | 7/2017 | Jung ................... | H04B 7/0408 |

OTHER PUBLICATIONS

"3rd Generation Partnership Project: Technical Specification Group Radio Access Network; Evolved Universal Terrestrial Radio Access (E-UTRA); Radio Resource Control (RRC); Protocol Specification", Release 13, 3GPP TS 36.331, vol. 13.2.0, Jun. 2016, 4 pages.

* cited by examiner

METHOD AND APPARATUS FOR TRANSMITTING BEAM-FORMED PAGING BASED ON FEEDBACK IN WIRELESS COMMUNICATION SYSTEM

CROSS-REFERENCE TO RELATED APPLICATIONS

Pursuant to 35 U.S.C. § 119(e), this application claims the benefit of U.S. Provisional Patent Application No. 62/364,829, filed on Jul. 20, 2016, the contents of which are hereby incorporated by reference herein in its entirety.

BACKGROUND OF THE INVENTION

Field of the Invention

The present invention relates to wireless communications, and more particularly, to a method and apparatus for transmitting a beam-formed paging based on a feedback in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

As more and more communication devices require more communication capacity, there is a need for improved mobile broadband communication over existing radio access technology. Also, massive machine type communications (MTC), which provides various services by connecting many devices and objects, is one of the major issues to be considered in the next generation communication. In addition, communication system design considering reliability/latency sensitive service/UE is being discussed. The introduction of next generation radio access technology considering enhanced mobile broadband communication, massive MTC, ultra-reliable and low latency communication (URLLC) is discussed. This new technology may be called new radio access technology (new RAT or NR) for convenience.

In NR, analog beamforming may be introduced. Accordingly, when analog beamforming is used in NR, a method for transmitting a paging message efficiently may be required.

SUMMARY OF THE INVENTION

The present invention provides a method and apparatus for transmitting a beam-formed paging based on a feedback in a wireless communication system. The present invention provides broadcast transmission by using beamforming technology in new radio access technology (new RAT or NR).

In an aspect, a method for transmitting a feedback for beam-formed paging, by a user equipment (UE), in a wireless communication system is provided. The method includes receiving, by the UE in a first period, a paging indicator via multiple beams from a network node, selecting, by the UE, a beam from the multiple beams, transmitting, by the UE in a second period, a feedback indicating the selected beam to the network node via the selected beam, and monitoring, by the UE in a third period, the selected beam to acquire a paging message from the network node.

In another aspect, a user equipment (UE) in a wireless communication system is provided. The UE includes a memory, a transceiver, and a processor, coupled to the memory and the transceiver, that controls the transceiver to receive, in a first period, a paging indicator via multiple beams from a network node, selects a beam from the multiple beams, controls the transceiver to transmit, in a second period, a feedback indicating the selected beam to the network node via the selected beam, and monitors, in a third period, the selected beam to acquire a paging message from the network node.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
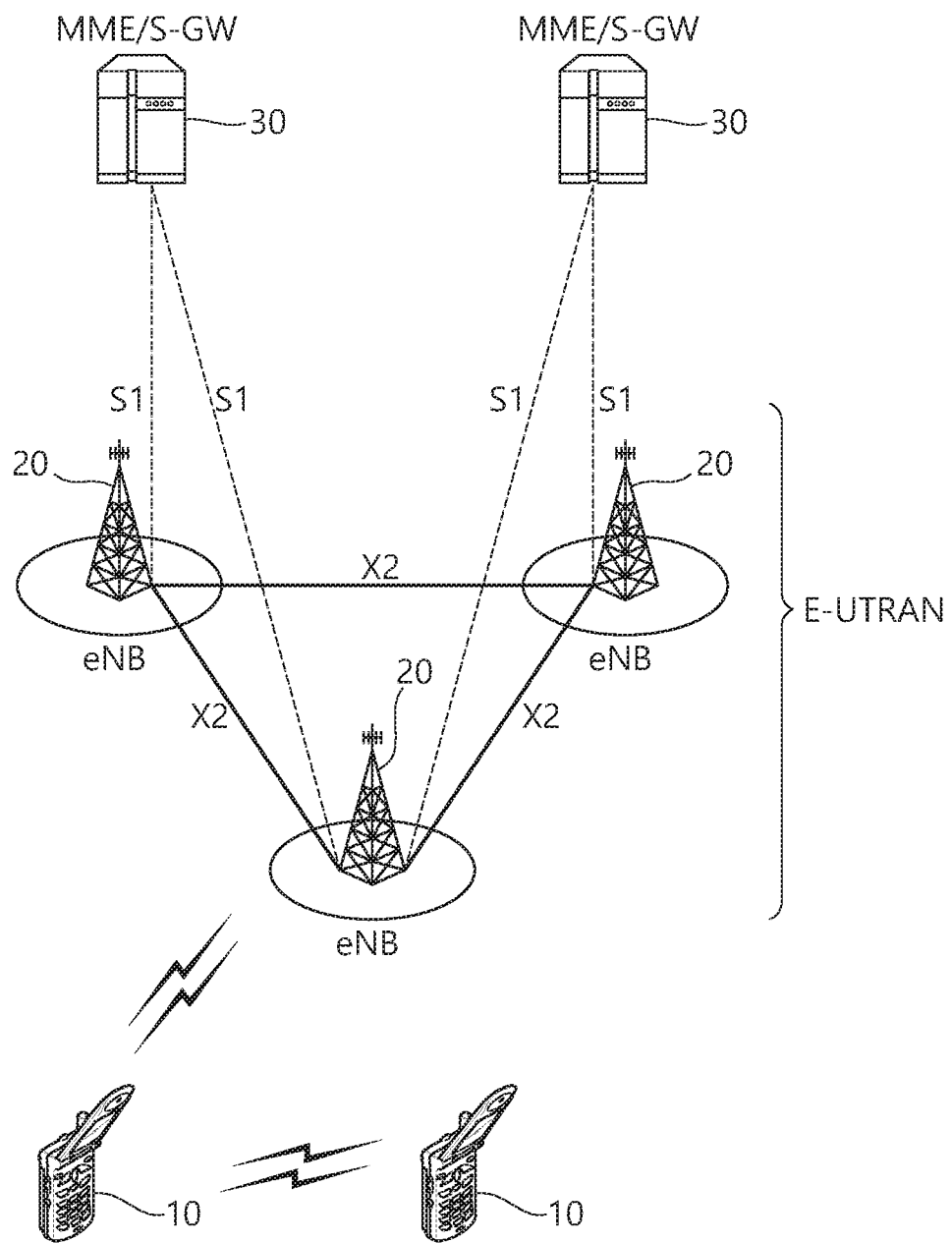
FIG. 1 shows LTE system architecture.

FIG. 1 shows LTE system architecture. Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10. An uplink (UL) denotes communication from the UE 10 to the eNB 20. A sidelink (SL) denotes communication between the UEs 10. In the DL, a transmitter may be a part of the eNB 20, and a receiver may be a part of the UE 10. In the UL, the transmitter may be a part of the UE 10, and the receiver may be a part of the eNB 20. In the SL, the transmitter and receiver may be a part of the UE 10.

The EPC includes a mobility management entity (MME) and a serving gateway (S-GW). The MME/S-GW 30 provides an end point of session and mobility management function for the UE 10. For convenience, MME/S-GW 30 will be referred to herein simply as a "gateway," but it is understood that this entity includes both the MME and S-GW. A packet data network (PDN) gateway (P-GW) may be connected to an external network.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The UEs 10 are connected to each other via a PC5 interface. The eNBs 20 are connected to each other via an X2 interface. Neighboring eNBs may have a meshed network structure that has the X2 interface. The eNB 20 is connected to the gateway 30 via an S1 interface.

Figure 2:
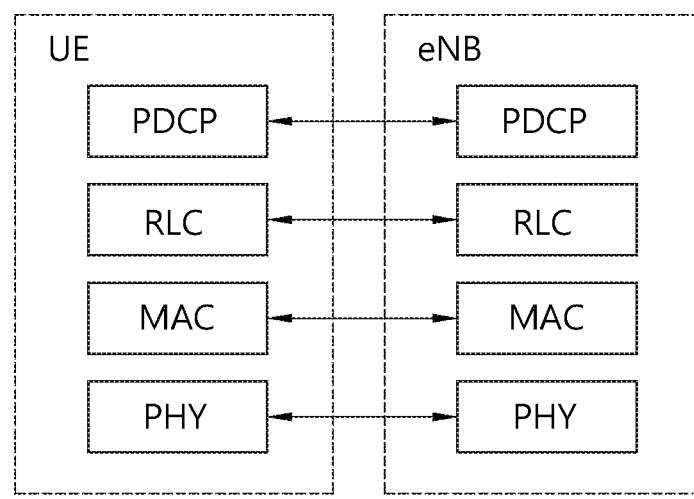
FIG. 2 shows a block diagram of a user plane protocol stack of an LTE system.
Figure 3:
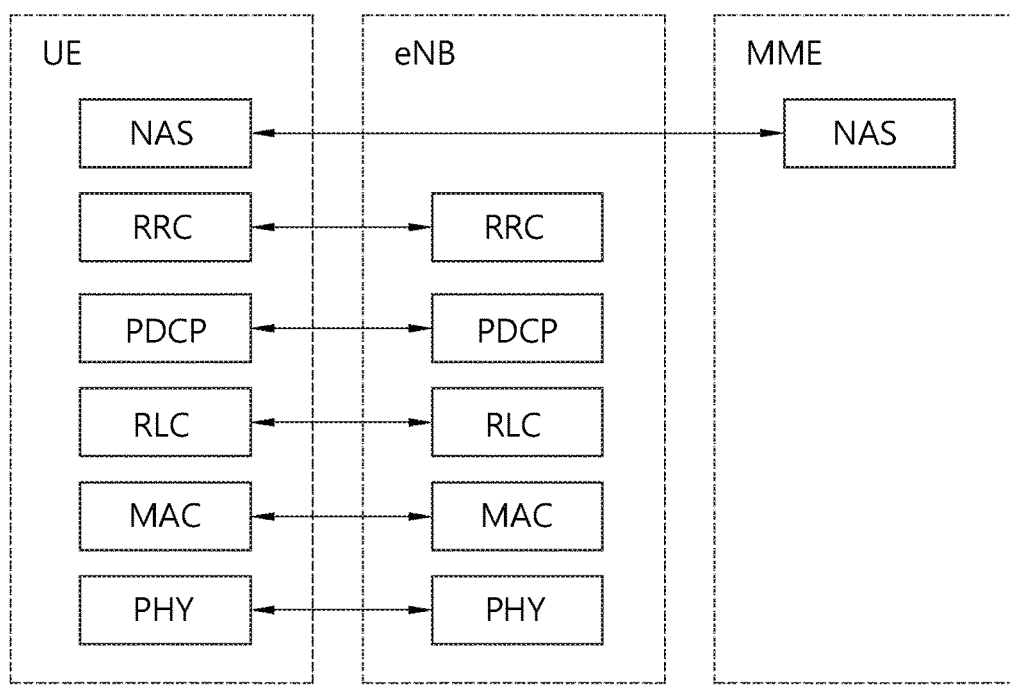
FIG. 3 shows a block diagram of a control plane protocol stack of an LTE system.

FIG. 2 shows a block diagram of a user plane protocol stack of an LTE system. FIG. 3 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel The PHY layer is connected to a medium access control (MAC) layer, which is a higher layer of the PHY layer, through a transport channel. A physical channel is mapped to the transport channel. Data between the MAC layer and the PHY layer is transferred through the transport channel Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or Ipv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 2, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 3, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as SAE bearer management, authentication, LTE_IDLE mobility handling, paging origination in LTE_IDLE, and security control for the signaling between the gateway and UE.

A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, and an uplink shared channel (UL-SCH) for transmitting user traffic or control signals. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both UL and DL. The MTCH is a point-to-multipoint downlink channel for transmitting traffic data from the network to the UE.

UL connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Paging is described. It may be referred to as Section 5.3.2 of 3GPP TS 36.331 V13.2.0 (2016-06) and Section 7 of 3GPP TS 36.304 V13.2.0 (2016-06).

The purpose of the paging procedure is to transmit paging information to a UE in RRC_IDLE and/or, to inform UEs in RRC_IDLE and UEs other than narrowband internet-of-things (NB-IoT) UEs in RRC_CONNECTED about a system information change and/or, to inform UEs other than NB-IoT UEs about an earthquake and tsunami warning system (ETWS) primary notification and/or ETWS secondary notification and/or, to inform UEs other than NB-IoT UEs about a commercial mobile alert system (CMAS) notification and/or, to inform UEs other than NB-IoT UEs in RRC_IDLE about an extended access barring (EAB) parameters modification and/or, to inform UEs other than NB-IoT UEs in RRC_IDLE to perform E-UTRAN inter-frequency redistribution procedure. The paging information is provided to upper layers, which in response may initiate RRC connection establishment, e.g. to receive an incoming call.

Figure 4:
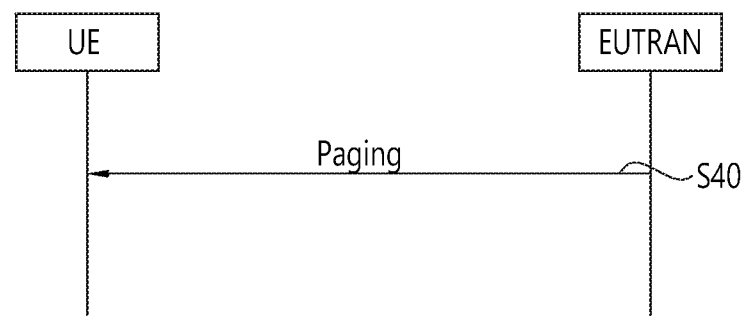
FIG. 4 shows a paging procedure.

FIG. 4 shows a paging procedure. In step S40, the E-UTRAN initiates the paging procedure by transmitting the Paging message at the UE's paging occasion. The E-UTRAN may address multiple UEs within a Paging message by including one PagingRecord for each UE. The E-UTRAN may also indicate a change of system information, and/or provide an ETWS notification or a CMAS notification in the Paging message.

Upon receiving the Paging message, the UE shall:

1> if in RRC_IDLE, for each of the PagingRecord, if any, included in the Paging message:

2> if the ue-Identity included in the PagingRecord matches one of the UE identities allocated by upper layers:

3> forward the ue-Identity and, except for NB-IoT, the cn-Domain to the upper layers;

1> if the systemInfoModification is included; or

1> if the UE is configured with a discontinuous reception (DRX) cycle longer than the modification period and the systemInfoModification-eDRX is included:

2> re-acquire the required system information using the system information acquisition procedure.

1> if the etws-Indication is included and the UE is ETWS capable:

2> re-acquire SystemInformationBlockType1 immediately, i.e., without waiting until the next system information modification period boundary;

2> if the schedulingInfoList indicates that SystemInformationBlockType10 is present:

3> acquire SystemInformationBlockType10;

2> if the schedulingInfoList indicates that SystemInformationBlockType11 is present:
3> acquire SystemInformationBlockType11;
1> if the cmas-Indication is included and the UE is CMAS capable:
2> re-acquire SystemInformationBlockType1 immediately, i.e., without waiting until the next system information modification period boundary;
2> if the schedulingInfoList indicates that SystemInformationBlockType12 is present:
3> acquire SystemInformationBlockType12;
1> if in RRC_IDLE, the eab-ParamModification is included and the UE is EAB capable:
2> consider previously stored SystemInformationBlockType14 as invalid;
2> re-acquire SystemInformationBlockType1 immediately, i.e., without waiting until the next system information modification period boundary;
2> re-acquire SystemInformationBlockType14 using the system information acquisition procedure;
1> if in RRC_IDLE, the redistributionIndication is included and the UE is redistribution capable:
2> Perform E-UTRAN inter-frequency redistribution procedure;

The UE may use DRX in idle mode in order to reduce power consumption. One paging occasion (PO) is a subframe where there may be paging radio network temporary identifier (P-RNTI) transmitted on PDCCH or machine-type communication (MTC)-PDCCH (MPDCCH) addressing the paging message. In P-RNTI transmitted on MPDCCH case, PO refers to the starting subframe of MPDCCH repetitions.

One paging frame (PF) is one radio frame, which may contain one or multiple PO(s). When DRX is used the UE needs only to monitor one PO per DRX cycle. One paging narrowband (PNB) is one narrowband, on which the UE performs the paging message reception.

PF, PO, and PNB are determined by following formulae using the DRX parameters provided in system information. PF is given by Equation 1.

$$\text{SFN mod } T = (T \text{ div } N)*(UE\_ID \text{ mod } N) \quad \text{<Equation 1>}$$

Index pointing to PO from subframe pattern will be derived from Equation 2.

$$i\_s = \text{floor}(UE\_ID/N) \text{ mod } Ns \quad \text{<Equation 2>}$$

If P-RNTI is monitored on MPDCCH, the PNB is determined by Equation 3.

$$PNB = \text{floor}(UE\_ID/(N*Ns)) \text{ mod } Nn \quad \text{<Equation 3>}$$

System information DRX parameters stored in the UE shall be updated locally in the UE whenever the DRX parameter values are changed in system information. If the UE has no international mobile subscriber identity (IMSI), for instance when making an emergency call without universal subscriber identification module (USIM), the UE shall use as default identity UE_ID=0 in the PF, i_s, and PNB formulas above.

The following Parameters are used for the calculation of the PF, i_s, and PNB:

T: DRX cycle of the UE. If a UE specific extended DRX value of 512 radio frames is configured by upper layers, T=512. Otherwise, T is determined by the shortest of the UE specific DRX value, if allocated by upper layers, and a default DRX value broadcast in system information. If UE specific DRX is not configured by upper layers, the default value is applied.
nB: 4T, 2T, T, T/2, T/4, T/8, T/16, T/32.
N: min(T,nB)
Ns: max(1,nB/T)
Nn: number of PNBs provided in system information
UE_ID: IMSI mod 1024, if P-RNTI is monitored on PDCCH, or IMSI mod 16384, if P-RNTI is monitored on MPDCCH.

IMSI is given as sequence of digits of type Integer (0. .9), IMSI shall in the formulae above be interpreted as a decimal integer number, where the first digit given in the sequence represents the highest order digit.

The UE may be configured by upper layers with an extended DRX (eDRX) cycle $T_{eDRX}$. The UE may operate in extended DRX only if the cell indicates support for eDRX in system information.

If the UE is configured with a $T_{eDRX}$ cycle of 512 radio frames, it monitors POs with parameter T=512. Otherwise, a UE configured with eDRX monitors POs (i.e, based on the upper layer configured DRX value and a default DRX value), during a periodic paging time window (PTW) configured for the UE or until a paging message including the UE's NAS identity is received for the UE during the PTW, whichever is earlier. The PTW is UE-specific and is determined by a paging hyperframe (PH), a starting position within the PH (PTW_start) and an ending position (PTW_end). PH, PTW_start and PTW_end are given by the following formulae. The PH is the H-SFN satisfying Equation 4.

$$\text{H-SFN mod } T_{eDRX,H} = (UE\_ID \text{ mod } T_{eDRX,H}), \text{ where} \quad \text{<Equation 4>}$$

UE_ID: IMSI mod 1024
$T_{eDRX,H}$: eDRX cycle of the UE in hyper-frames, ($T_{eDRX,H}$=1, 2, . . . , 256 hyper-frames) and configured by upper layers PTW_start denotes the first radio frame of the PH that is part the PTW and has SFN satisfying Equation 5.

$$SFN = 256*i_{eDRX}, \text{ where } i_{eDRX} = \text{floor}(UE\_ID/T_{eDRX,H}) \text{ mod } 4 \quad \text{<Equation 5>}$$

PTW_end is the last radio frame of the PTW and has SFN satisfying Equation 6.

$$SFN = (PTW\_start + L*100 - 1) \text{ mod } 1024, \text{ where}$$
$$L = PTW \text{ length (in seconds) configured by upper layers} \quad \text{<Equation 6>}$$

Analog beamforming is described. 5th generation mobile networks or 5th generation wireless systems, abbreviated 5G, are the proposed next telecommunications standards beyond the current 4G LTE/international mobile telecommunications (IMT)-advanced standards. 5G includes both new radio access technology (new RAT or NR) and LTE evolution. Hereinafter, among 5G, NR will be focused. 5G planning aims at higher capacity than current 4G LTE, allowing a higher density of mobile broadband users, and supporting device-to-device, ultra-reliable, and massive machine communications. 5G research and development also aims at lower latency than 4G equipment and lower battery consumption, for better implementation of the Internet of things.

It has been discussed to introduce millimeter wave (mmW) in NR. In case of mmW, the wavelength is shortened so that a plurality of antennas can be installed in the same area. For example, in the 30 GHz band, a total of 100 antenna elements can be installed in a 2-dimension array of 0.5 lambda (wavelength) intervals on a panel of 5 by 5 cm with a wavelength of 1 cm. Therefore, in mmW, multiple antenna elements can be used to increase the beamforming gain to increase the coverage or increase the throughput.

In this case, if a transceiver unit (TXRU) is provided so that transmission power and phase can be adjusted for each antenna element, independent beamforming is possible for each frequency resource. However, installing a TXRU on all 100 antenna elements has a problem in terms of cost effectiveness. Therefore, a method of mapping a plurality of antenna elements to one TXRU and adjusting the direction of a beam using an analog phase shifter is considered. This analog beamforming method has a disadvantage that it cannot perform frequency selective beaming because it can make only one beam direction in all bands.

A hybrid beamforming with B TXRUs, which is an intermediate form of digital beamforming and analog beamforming, and fewer than Q antenna elements, can be considered. In this case, although there is a difference depending on the connection method of the B TXRU and Q antenna elements, the direction of the beam that can be simultaneously transmitted is limited to B or less.

In NR, it may be challenging to provide broadcast transmission by using beamforming technology. Hereinafter, a method for transmitting a beam-formed paging based on a feedback is described according to an embodiment of the present invention. In the present invention, the UE may monitor a first period where a paging indicator can be transmitted and repeated over multiple beams. The first period may correspond to a paging interval. The UE may receive the paging indicator in the first period via the multiple beams.

The UE may select a beam of which a quality is best among those beams or above a threshold. The paging indicator may request a feedback for the UE. Then, the UE may transmit the feedback indicating the selected beam in a second period. The feedback may be transmitted via the selected beam. Then, the UE may monitor a channel in a third period to acquire a paging message. The third period may correspond to a PO.

Figure 5:
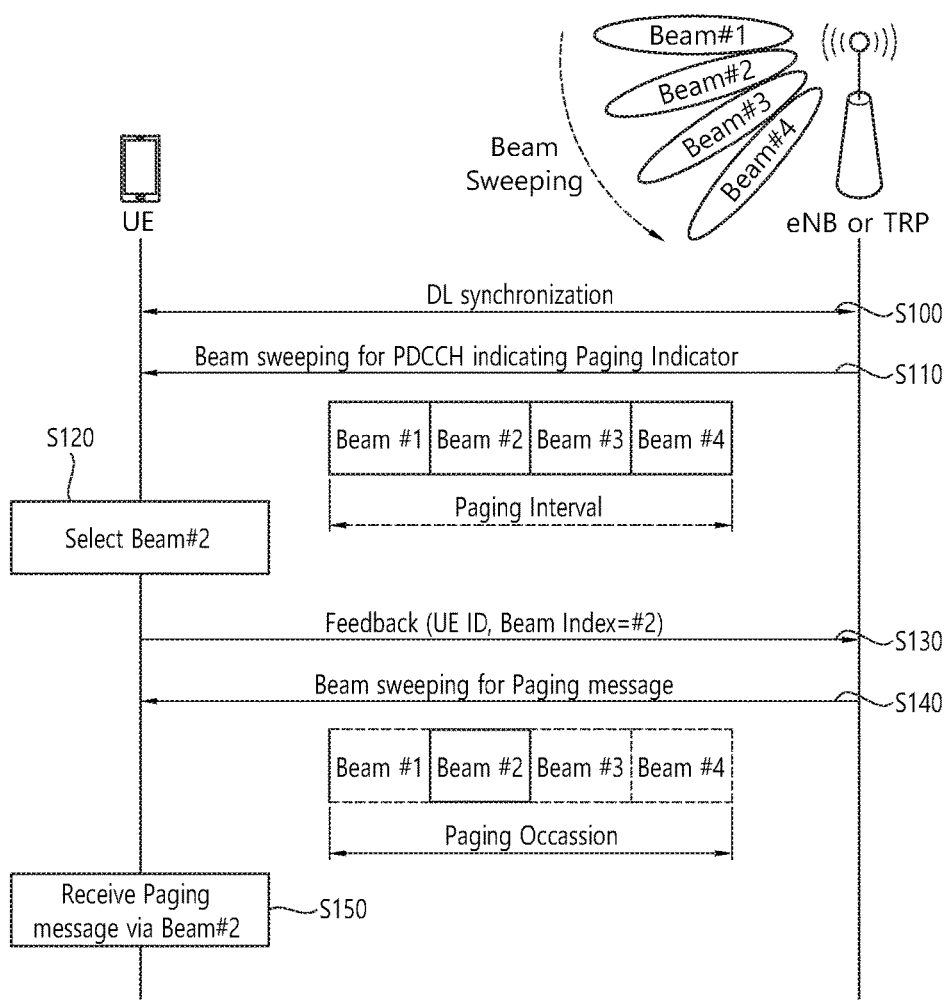
FIG. 5 shows a method for receiving a beam-formed paging based on a feedback according to an embodiment of the present invention.

FIG. 5 shows a method for receiving a beam-formed paging based on a feedback according to an embodiment of the present invention. In this embodiment, a network node, e.g. eNB or transmission/reception point (TRP), may sweep its antenna beams fully or partially for DL transmission. It means that the eNB or TRP may perform DL transmission by using multiple beams. Hereinafter, for the convenience, eNB is used for the network node, but the present invention is not limited thereto.

In step S100, the UE performs DL synchronization with the eNB. The UE may receive master information block (MIB) and/or system information block (SIB) from the eNB. The MIB and/or SIB may carry system frame number (SFN) and/or hyper SFN. The UE may calculate a paging interval where the UE should monitor a paging channel to receive a paging indicator or a paging message. The paging interval may be one of the PO, PTW, PF or paging hyper frame. The paging interval may be calculated based on UE ID. Further, the paging interval may be calculated based on a selected beam index, which will be described below.

In step S110, the eNB transmits a PDCCH indicating a paging indicator in the paging interval by using beam sweeping. The paging indicator may be a RNTI, such as the P-RNTI on PDCCH. The paging indicator may indicate at least one of a group of UEs, a group of UE identities, a particular type of UE (e.g. delay tolerant devices or vehicular UEs), a particular UE category, a particular service, or a group of services. The paging indicator may also indicate that beam index can be included in a feedback, which will be described below.

By using beam sweeping, the eNB may use multiple beams for transmitting the PDCCH indicating the paging indicator. The eNB may fully or partially sweep its antenna beams. Different beams may be transmitted at different time intervals, e.g. subframes or symbols possibly with beam reference signal (BRS). In FIG. 5, eNB uses beam #1, #2, #3 and #4 for transmitting the PDCCH indicating the paging indicator in the paging interval. The paging interval may include a paging interval for beam #1, for beam #2, for beam #3 and for beam #4.

In step S120, the UE measures quality of each beam among the multiple beams. The multiple beams may be transmitted at different time intervals. The UE selects a beam among the multiple beams. The selected beam may provide the highest measured quality among the multiple beams. Alternatively, the UE may select one or more beams among the multiple beams, and the selected one or more beams may provide the measured quality, which is above a threshold or is not below a threshold. In FIG. 5, it is assumed that beam #2 is selected.

If the paging indicator is received in the paging occasion where UE monitors, and/or if what the paging indicator indicates corresponds to the UE, then in step S130, the UE transmits a feedback to the eNB. The feedback may be transmitted via the selected beam. The feedback indicates a beam index of the selected beam (i.e. beam #2). The feedback may further indicate UE ID. The feedback may be transmitted by one of the following options:

Option 1: The feedback may be transmitted via a random access preamble. One of a random access preamble, a random access preamble set or a random access resource may indicate the selected beam. Mapping between the beam and the random access preamble, the random access preamble set or the random access resource may be signaled to the UE via system information from the eNB.

Option 2: The feedback may be transmitted via a MAC control element (CE). The MAC CE may include the selected beam index and the UE ID.

Option 3: The feedback may be transmitted via a RRC message. The RRC message may include the selected beam index and the UE ID. The RRC message may be a RRC Connection Request message transmitted during a RRC connection establishment procedure. Or, the RRC message may be a RRC connection resume request message transmitted during a RRC connection resume procedure. Or, the RRC message may be a RRC connection re-establishment request message transmitted during a RRC connection re-establishment procedure. Or, the RRC message may be a cell update message transmitted during a RRC cell update procedure.

Further, the UE may start a timer after transmitting the feedback to the eNB. The UE may receive the value of the timer via system information from the eNB.

Upon receiving the feedback including the beam index of the selected beam from the UE, then in step S140, the eNB transmits a paging message via the selected beam in the PO. The PO may be calculated based on the UE ID and/or the selected beam index. The paging message may be transmitted over a physical downlink shared channel (PDSCH).

During a certain period after transmitting the feedback, in step S150, the UE monitors only the selected beam in all or a part of the PO where the paging message is transmitted via the selected beam. Namely, the UE may monitor only the selected beam until the timer expires. The UE may receive the paging message via the selected beam (i.e. beam #2) before the timer expires.

If no paging message including the UE ID is received during the period, i.e. until the timer expires, the UE may monitor all of the multiple beams in paging intervals or POs.

Figure 6:
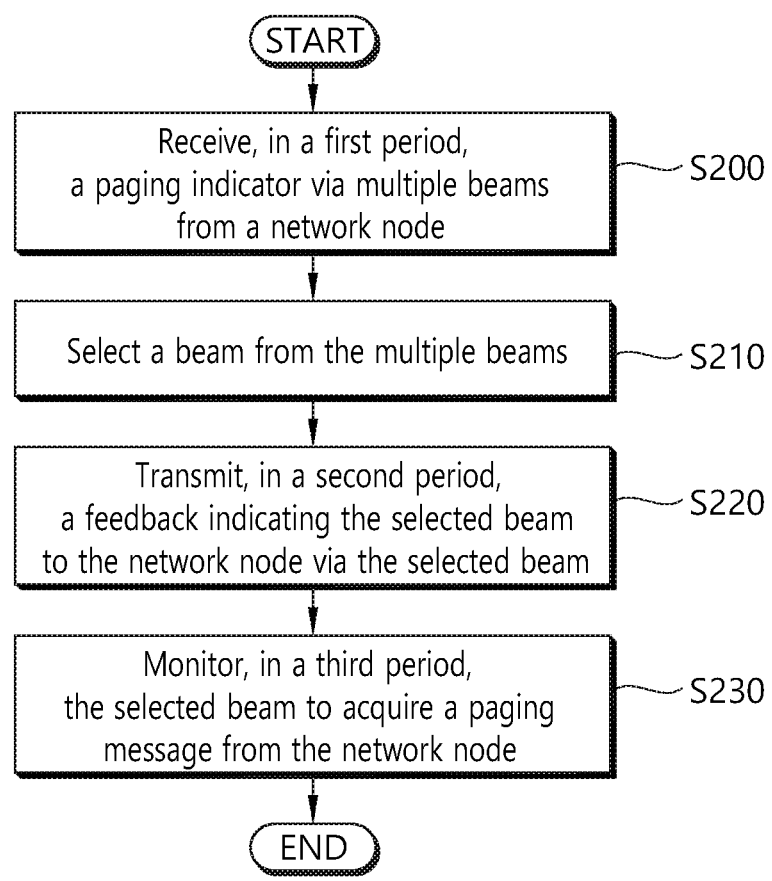
FIG. 6 shows a method for transmitting a feedback for beam-formed paging, by a UE, according to an embodiment of the present invention.

FIG. 6 shows a method for transmitting a feedback for beam-formed paging, by a UE, according to an embodiment of the present invention. The present invention described above may be applied to this embodiment.

In step S200, the UE receives, in a first period, a paging indicator via multiple beams from a network node. The paging indicator may indicate that the feedback indicating the selected beam is requested from the UE. The paging indicator may correspond to a P-RNTI on a PDCCH. The paging indicator indicates at least one of a group of UEs, a group of UE identities, a particular type of UE, a particular UE category, a particular service, or a group of services. The paging indicator may be received via the multiple beams at different time intervals in the first period. The first period may correspond to a paging interval.

In step S210, the UE selects a beam from the multiple beams. The selected beam may have a highest quality among the multiple beams. Or, the selected beam may have a quality above a threshold.

In step 220, the UE transmits, in a second period, a feedback indicating the selected beam to the network node via the selected beam. The feedback indicating the selected beam may correspond to a beam index of the selected beam. The feedback may include an identity of the UE. The feedback indicating the selected beam may be mapped to one of a random access preamble, a random access preamble set, or a random access resource. In this case, a mapping relationship between the selected beam and one of the random access preamble, the random access preamble set, or the random access resource may be indicated via system information from the network node. Or, the feedback may be transmitted via MAC CE or RRC message. Further, the UE may start a timer after transmitting the feedback.

In step S230, the UE monitors, in a third period, the selected beam to acquire a paging message from the network node. The third period may correspond to a paging occasion. The paging occasion may be calculated based on an identity of the UE and the selected beam. The paging message may be acquired via the selected beam before the timer expires. Or, if the paging message is not acquired via the selected beam until the timer expires, the UE may monitor the multiple beams to acquire the paging message from the network node.

Figure 7:
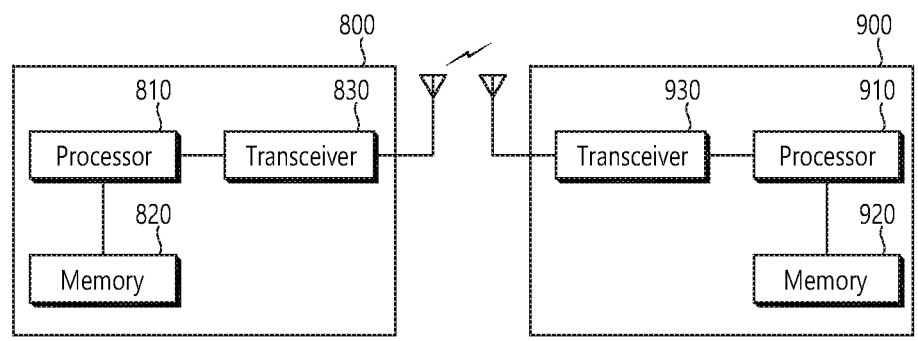
FIG. 7 shows a wireless communication system to implement an embodiment of the present invention.

FIG. 7 shows a wireless communication system to implement an embodiment of the present invention.

A network node 800 includes a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

According to the present invention, when analog beamforming is used in NR, the network node can transmit a paging message based on a feedback received from a UE. The network node can transmit a paging message only via a selected beam, thereby transmission efficiency of the paging message can be improved. Further, the UE can monitor only the selected beam to acquire the paging message, thereby UE battery consumption can be reduced.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method performed by a user equipment (UE), in a wireless communication system, the method comprising:
    receiving, by the UE in a first paging occasion, a paging information via multiple beams from a network node, wherein the paging information requests the UE for a feedback message response to the paging information, and
    wherein the paging information informs a particular type of UE;
    selecting, by the UE, a beam from the multiple beams, when the UE is the particular type of UE;
    transmitting, by the UE, the feedback message to the network node via the selected beam,
    wherein the feedback message includes information on the selected beam and an identity (ID) of the UE; and
    monitoring, by the UE in a second paging occasion, the selected beam to acquire a paging message from the network node,
    wherein the feedback message is transmitted via a media access control (MAC) control element (CE).

2. The method of claim 1, wherein the paging information is related to a paging radio network temporary identity (P-RNTI) on a physical downlink control channel (PDCCH).

3. The method of claim 1, wherein the paging information is received via the multiple beams at different time intervals in the first paging occasion.

4. The method of claim 1, wherein the selected beam has a highest quality among the multiple beams.

5. The method of claim 1, wherein the selected beam has a quality above a threshold.

6. The method of claim 1, wherein the feedback message informs the selected beam based on a beam index of the selected beam.

7. The method of claim 1, further comprising:
starting a timer after transmitting the feedback.

8. The method of claim 7, wherein the paging message is acquired via the selected beam before the timer expires.

9. The method of claim 7, when the paging message is not acquired via the selected beam until the timer expires,
further comprising monitoring the multiple beams to acquire the paging message from the network node.

10. A user equipment (UE) in a wireless communication system, the UE comprising:
a memory;
a transceiver; and
a processor, coupled to the memory and the transceiver, that:
controls the transceiver to receive, in a first paging occasion, a paging information via multiple beams from a network node,
wherein the paging information requests the UE for a feedback message response to the paging information, and
wherein the paging information informs a particular type of UE,
selects a beam from the multiple beams, when the UE is the particular type of UE,
controls the transceiver to transmit the feedback message to the network node via the selected beam,
wherein the feedback message includes information on the selected beam and an identity (ID) of the UE, and
monitors, in a second paging occasion, the selected beam to acquire a paging message from the network node,
wherein the feedback message is transmitted via a media access control (MAC) control element (CE).

* * * * *